US008495910B2

(12) United States Patent
Nishida et al.

(10) Patent No.: US 8,495,910 B2
(45) Date of Patent: Jul. 30, 2013

(54) AIR-FUEL RATIO ESTIMATING/DETECTING DEVICE

(75) Inventors: Kenji Nishida, Wako (JP); Tetsuya Kaneko, Wako (JP); Tomiyuki Sasaki, Wako (JP); Shinichi Wagatsuma, Wako (JP); Satoshi Honma, Wako (JP); Naoki Sakamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/411,805

(22) Filed: Mar. 5, 2012

(65) Prior Publication Data

US 2012/0234085 A1 Sep. 20, 2012

(30) Foreign Application Priority Data

Mar. 16, 2011 (JP) ................................ 2011-057872

(51) Int. Cl.
*G01M 15/10* (2006.01)

(52) U.S. Cl.
USPC ...................................................... 73/114.72

(58) Field of Classification Search
USPC ...................................................... 73/114.72
See application file for complete search history.

(56) References Cited

U.S. PATENT DOCUMENTS

| | | | | |
|---|---|---|---|---|
| 7,677,091 | B2 * | 3/2010 | Mukai et al. | 73/114.37 |
| 7,905,135 | B2 * | 3/2011 | Nakano et al. | 73/114.33 |
| 8,024,105 | B2 * | 9/2011 | Iwazaki et al. | 701/107 |
| 8,365,587 | B2 * | 2/2013 | Suetsugu et al. | 73/114.72 |
| 2006/0005821 | A1 * | 1/2006 | Osumi et al. | 123/674 |
| 2012/0116545 | A1 * | 5/2012 | Yasui | 700/30 |
| 2012/0298085 | A1 * | 11/2012 | Nose et al. | 123/676 |

FOREIGN PATENT DOCUMENTS

JP 2011-027061 2/2011

* cited by examiner

*Primary Examiner* — Freddie Kirkland, III
(74) *Attorney, Agent, or Firm* — Squire Sanders (US) LLP

(57) ABSTRACT

An air-fuel ratio estimating device can include an amount of fuel injected calculating unit which can estimate the amount of fuel injected GF for each cycle on the basis of a driving time Tout of a fuel injection valve. A proportional constant calculating section determines a proportional constant K, using the estimated charging efficiency CE and the amount of fuel injected Gf, when the output value of a sensor is in a transition region R. When the sensor output value is not in the transition region R, an air-fuel ratio A/F is estimated from the determined proportional constant K, a charging efficiency CE calculated by a calculating section, and the amount of fuel injected Gf.

10 Claims, 7 Drawing Sheets

AIR-FUEL RATIO ESTIMATING/DETECTING DEVICE

BACKGROUND

1. Field

The present invention relates to an air-fuel ratio estimating/detecting device, and more particularly, to an air-fuel ratio estimating/detecting device that can detect a wide-range of air-fuel ratio by estimation without using a so-called wide-range air-fuel ratio sensor.

2. Description of the Related Art

There has been known a technology of indirectly detecting an air-fuel ratio (hereafter, also referred to as "A/F") by detecting the concentration of oxygen in the exhaust gas of an engine and performing combustion control of the engine, including ignition control or fuel injection control, on the basis of the detection result. Further, as an oxygen concentration sensor that is a detecting element detecting the concentration of oxygen in the exhaust gas, a so-called λ-sensor of which the electromotive force, that is, the detection output is rapidly changed (in a stepwise fashion) at the interfaces of the oxygen concentration corresponding to a theoretical air-fuel ratio (air excess ratio=1) is widely used, due to the simplicity. According to the λ-sensor, it is possible to easily determine whether the air-fuel ratio is larger or smaller than the theoretical air-fuel ratio.

However, the λ-sensor, which detects the oxygen concentration only from the difference of the air-fuel ratio from the theoretical air-fuel ratio, cannot accurately detect the air-fuel ratio in the area departing from the theoretical air-fuel ratio. Therefore, the λ-sensor cannot be used control setting the air-fuel ratio into an optional value including the rich side and the lean side regions, other than the theoretical air-fuel ratio. Meanwhile, the wide-range air-fuel ratio sensor that can detect air-fuel ratio within a wide-range is expensive, because the structure is complicated.

Therefore, an air-fuel ratio estimating/detecting device that estimates an air-fuel ratio on the basis of the crank angular speed has been proposed, without using an oxygen concentration sensor, as disclosed in Patent Literature 1 (JP-A-2001-27061).

According to the air-fuel ratio estimating/detecting device described in Patent Literature 1, it is possible to estimate the air-fuel ratio without using an oxygen concentration sensor, and appropriately perform ignition control or fuel injection control on the basis of the estimated value. However, only the estimation of the air-fuel ratio based on the crank angular speed may be insufficient and means for estimating an air-fuel ratio with high accuracy is required.

SUMMARY

It is an object of the present invention to provide an air-fuel ratio estimating/detecting device that can estimate an air-fuel ratio in a wide-range without using a so-called wide-range air-fuel sensor.

In order to achieve the object, according to a first aspect of the present invention, an air-fuel ratio estimating/detecting device can include intake air volume estimating means that estimates intake air volume introduced into a cylinder of an engine. Fuel injection amount estimating unit can estimate the amount of fuel injected for each cycle on the basis of driving time of a fuel injection valve. An oxygen concentration detecting element is included, that has an output transition region where detection output according to concentration of oxygen remaining in a combustion gas is generated and the detection output changes in a stepwise fashion in accordance with the concentration of the remaining oxygen corresponding to a theoretical air-fuel ratio. A proportional constant determining unit is configured to determine a proportional constant of an air-fuel ratio and the theoretical air-fuel ratio by using the intake air volume estimated by the intake air volume estimating unit when an output value of the oxygen concentration detecting element is in the output transition region and the amount of fuel injected estimated by the amount of fuel injected estimating unit, in which when the output value of the oxygen concentration detecting element is not in the output transition region, the air-fuel ratio is estimated from the proportional constant determined by the proportional constant determining unit, the intake air volume, and the amount of fuel injected.

Further, according to a second aspect of the present invention, an air-fuel ratio estimating/detecting device can include a pulse generating unit configured to generate a crank pulse for each predetermined rotation angle of a crankshaft of an engine. A crank angular speed calculating unit is configured to calculate a first crank angular speed on the basis of an interval of two continuous crank pulses at a compression top dead center or above the compression top dead center of the engine, and calculates a second crank angular speed on the basis of an interval of two continuous optional crank pulses in a compression stroke. An intake air volume estimating unit is configured to calculate charging efficiency that is a function of the intake air volume from a difference between the first crank angular speed and the second crank angular speed, which are calculated by the crank angular speed calculating unit. A fuel injection amount estimating unit is configured to estimate the amount of fuel injected for each cycle on the basis of driving time of the fuel injection valve. An oxygen concentration detecting element is provided, that has an output transition region where detection output according to the concentration of oxygen remaining in a combustion gas is generated; the detection output changes in a stepwise fashion in accordance with the concentration of the remaining oxygen corresponding to a theoretical air-fuel ratio. A proportional constant determining unit is configured to determine a proportional constant of an air-fuel ratio and the theoretical air-fuel ratio by using the intake air volume estimated by the intake air volume estimating unit when an output value of the oxygen concentration detecting element is in the output transition region, and the amount of fuel injected estimated by the amount of fuel injected estimating means, in which when the output value of the oxygen concentration detecting element is not in the output transition region, the air-fuel ratio is estimated from the proportional constant K determined by the proportional constant determining unit, the charging efficiency, and the amount of fuel injected.

Further, according to a third aspect of the present invention, the air-fuel ratio estimating/detecting device includes an airflow sensor that senses the intake air volume in the engine, in which the intake air volume sensed by the airflow sensor is used for the calculation in the proportional constant determining unit, instead of the intake air volume estimated by the estimation intake air volume estimating unit.

According to the first to third aspects of the present invention, when theoretical air-fuel ratio control or stoichiometric control is performed by feeding-back the output of the oxygen concentration detecting element, the intake air volume and the amount of fuel supply are estimated and a proportional constant can be calculated backward by using an air-fuel calculation equation from the intake air volume, the amount of fuel supply, and the theoretical air-fuel ratio.

Thereby, it is possible to accurately estimate and detect an air-fuel ratio even in a large region departing from the theoretical air-fuel ratio, without using an expensive oxygen concentration detecting element that can detect an air-fuel ratio throughout a large region.

In particular, according to the second aspect of the present invention, since the intake air volume is estimated by using the charging efficiency that is a function of the intake air volume, it is possible to eliminate the airflow sensor.

DETAILED DESCRIPTION

Figure 1:
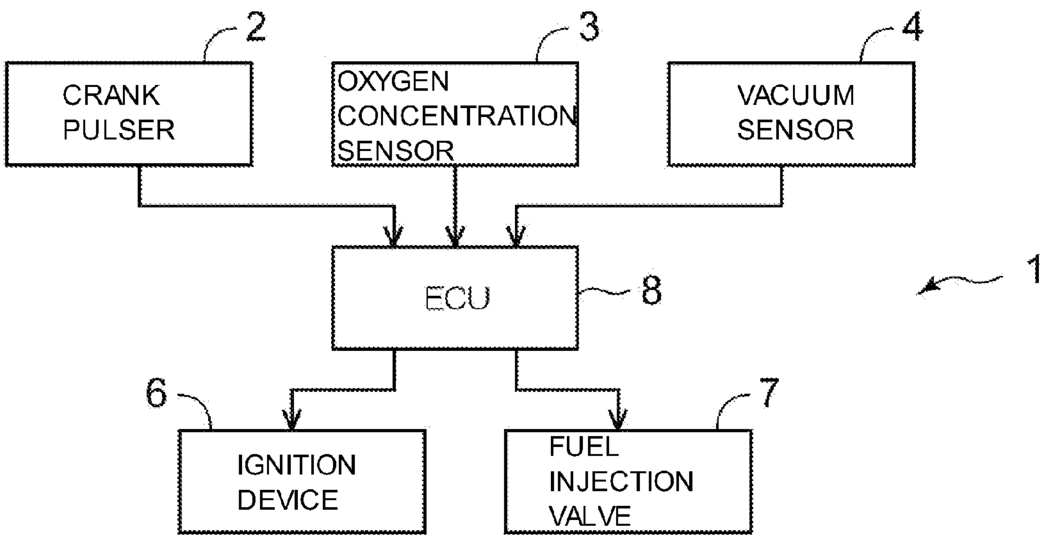
FIG. 1 is a block diagram showing a system configuration of an engine control device including an air-fuel estimating/detecting device according to an embodiment of the present invention.

Hereinafter, embodiments of the present invention will be described in detail with reference to the drawings. FIG. 1 is a block diagram showing the system configuration of an engine control device including an air-fuel estimating/detecting device according to an embodiment of the present invention. In FIG. 1, the engine control device 1 can include a crank pulser 2, an oxygen concentration sensor 3, a vacuum sensor 4, and an ECU 8 outputting instructions for driving an ignition device 6 and a fuel injection valve 7 by receiving detection signals from the crank pulser 2, the oxygen concentration sensor 3, and the vacuum sensor 4. The ECU 8 includes a microprocessor that performs the functions described below in connection with FIG. 4 or the like. The oxygen concentration sensor 3 can be, for example, a sensor that generates detection output corresponding to the concentration of oxygen remaining in an exhaust gas, and has an output transition region R where the detection output at the concentration of remaining oxygen corresponding to a theoretical air-fuel ratio changes in a stepwise fashion, as described below in connection with FIG. 3, and is mounted with an element portion made to face the inside of an exhaust pipe of an engine, which is not shown. The vacuum sensor 4 is mounted on an intake pipe of the engine and detects vacuum in the intake pipe. The crank pulser 2 is a magnetic pick-up type pulse generator and mounted opposite the outer circumference of a crank pulser rotor as described below.

Figure 2:
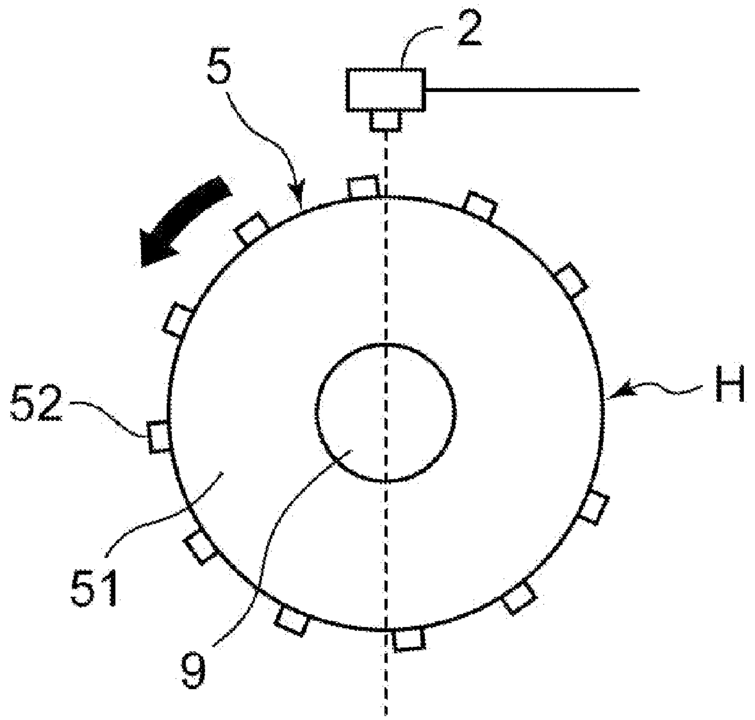
FIG. 2 is a front view of a crank pulser rotor.

FIG. 2 is a front view of a crank pulser rotor. The crank pulser rotor 5 is mounted on a crankshaft 9 of, in this example, a four cycle single-cylinder engine. The crank pulser rotor 5 is composed of a circular plate-shaped rotor main body 51 and reluctors 52 that protrude from the outer circumference of the rotor main body 51. A plurality of reluctors 52 are arranged at regular angular intervals, except for one untoothed position H (without the reluctor). Although eleven reluctors 52 are arranged at angular intervals of 30° in the embodiment, the arrangement angular interval and the number of the reluctors 52 may be optionally set as long as they are arranged at regular angular intervals and the one untoothed position H is provided. The crank pulser 2 is disposed opposite the outer circumference of the crank pulser rotor 5. The crank pulser 2 outputs a crank pulse by detecting the reluctors 52.

Figure 3:
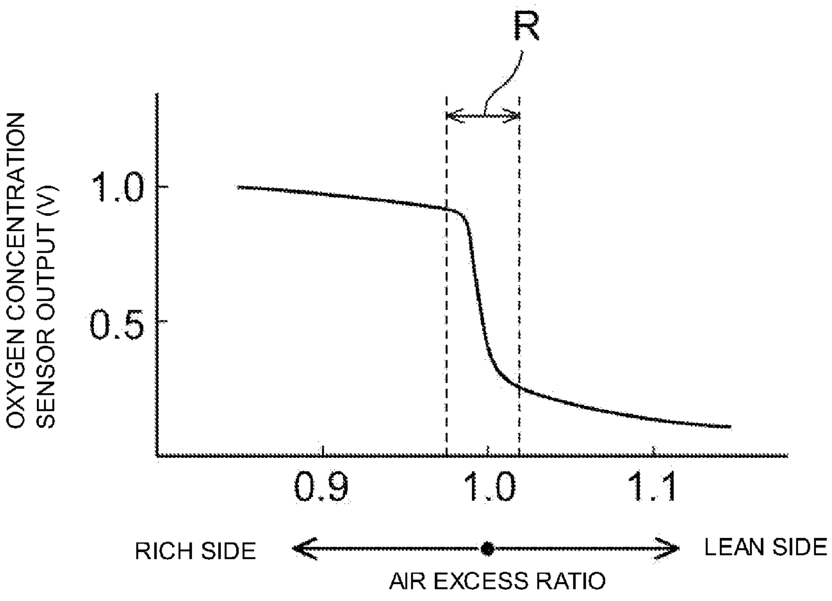
FIG. 3 is a diagram showing output features of an oxygen concentration sensor.

FIG. 3 is a diagram showing output features of the oxygen concentration sensor 3. In FIG. 3, the horizontal axis shows air excess ratio and the vertical axis shows the output of the oxygen concentration sensor 3. It is regarded as the theoretical air-fuel ratio when the air excess ratio is 1.0, and the region with the air excess ratio higher than the theoretical air-fuel ratio is the lean side with lean air-fuel mixture while the region with the air excess ratio lower than the theoretical air-fuel ratio is a rich side with rich air-fuel mixture. When the air-fuel mixture transits from the rich side to the lean side, the sensor output rapidly decreases, and when the air-fuel mixture transits from the lean side to the rich side, the sensor output rapidly increases. The air-fuel ratio is substantially the theoretical air-fuel ratio at the transition region R of the sensor output, with an exhaust gas state with good purifying ratio.

Figure 4:
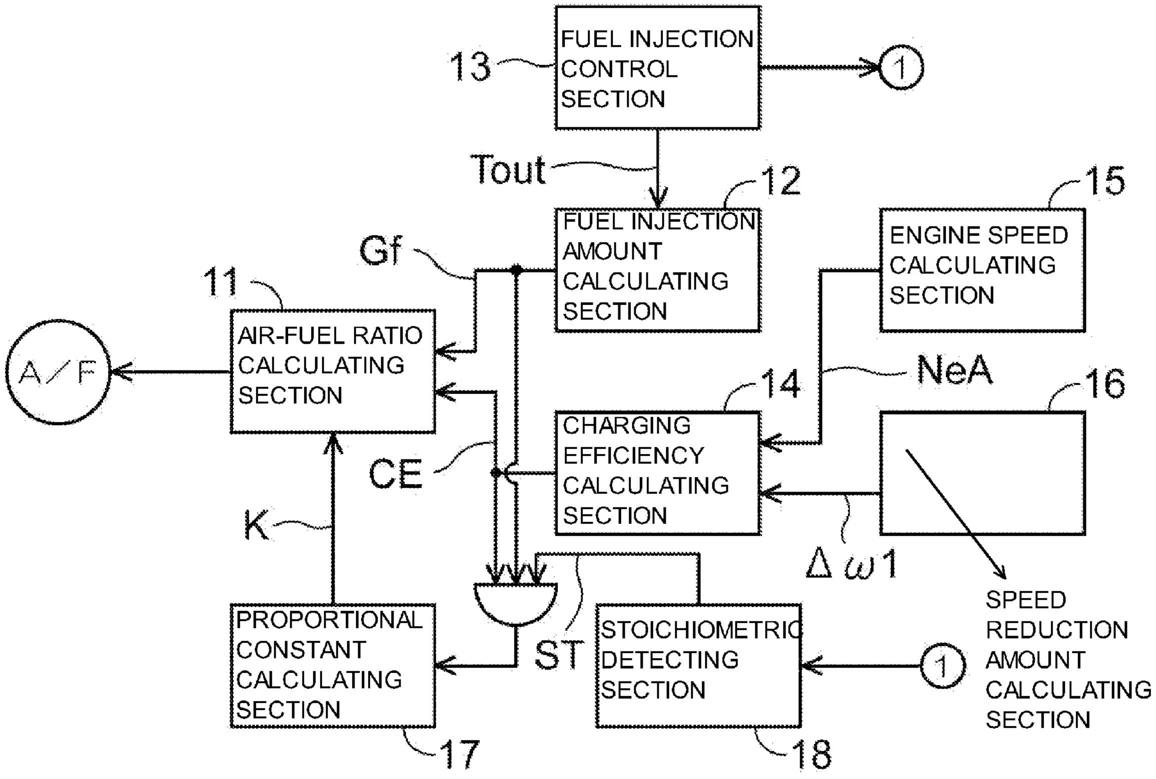
FIG. 4 is a block diagram showing the functions of the main parts of an ECU.

FIG. 4 is a block diagram showing the functions of the main parts of the ECU 8. In the ECU 8, an air-fuel ratio calculating section 11 calculates an air-fuel ratio A/F by using the amount (weight) of fuel injected Gf for each cycle of the engine, the charging efficiency CE that is a function of the intake air volume, and a proportional constant K, from Equation 1. Air-fuel Ratio $$A/F = K \times (CE/Gf) \quad \text{(Equation 1)}$$

The fuel injection amount calculating section 12 extracts an injection valve-open time Tout supplied for each cycle from a fuel injection control section 13 to the fuel injection valve 7, calculates the amount of fuel injected Gf on the basis of the extracted injection valve-open time, and inputs the amount of fuel injected to the air-fuel calculating section 11. The fuel is injected into the intake pipe by opening the fuel injection valve 7 for a predetermined time for each cycle, with the pressure of the fuel supply exhaust system kept constant by a pressure regulating valve. The injection valve-open time Tout is a control parameter for the fuel injection control calculation in the fuel injection control section 13. The amount of fuel injected Gf is proportionate to the injection valve-open time Tout under a constant supply pressure and calculated from Equation 2. Amount of fuel injected Gf=a0+b0×Tout . . . (Equation 2). The intercept a0 and the proportional constant b0 are values for compensating the injection valve-open time into the weight of fuel.

A charging efficiency calculating section 14 that is intake air volume estimation means calculates charging efficiency CE that is a function of the intake air volume by searching a predetermined map, from the amount of speed reduction $\Delta\omega 1$ of the crank angular speed in the compression stroke and the average engine speed NeA that is inputted from an engine speed detecting section 15, and inputs the charging efficiency to the air-fuel ratio calculating section 11. The amount of speed reduction $\Delta\omega 1$ is calculated by a speed reduction amount calculating section 16 on the basis of a crank pulse signal that is acquired from the crank pulser 2. The method of calculating the average engine speed NeA and the amount of speed reduction $\Delta\omega 1$ will be further described below.

The charging efficiency CE is a value showing the weight ratio of the intake air volume to displacement and the amount of speed reduction Δω1 is proportionate to the charging efficiency CE at a predetermined engine speed. The charging efficiency CE has the relationship of Equation 3 under a predetermined engine speed. Charging Efficiency CE=a1+b1×Δω1 . . . (Equation 3). The proportional constant b1 has a regular relationship of increasing with the increase in the engine speed. Therefore, the charging efficiency CE can be acquired as a function of the amount of speed reduction Δω1 and the engine speed.

Figure 5:
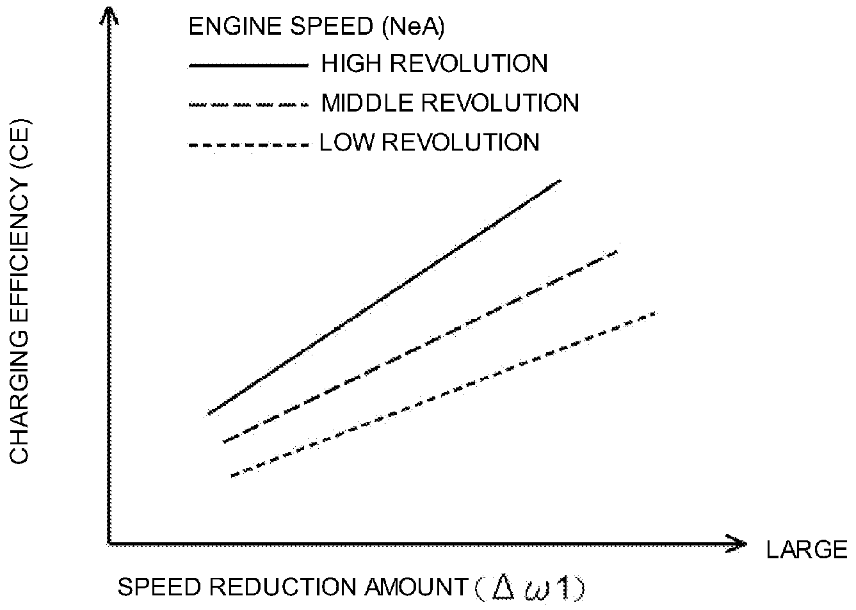
FIG. 5 is a diagram showing a map for determining a charging efficiency CE.

FIG. 5 is a map for determining the charging efficiency CE. In FIG. 5, the horizontal axis shows the amount of speed reduction Δω1 and the vertical axis shows the charging efficiency CE. A plurality of engine speeds NeA are provided as parameters in the map. FIG. 5 shows a high revolution speed, a middle revolution speed, and a low revolution speed in the map, and the tendency of the engine speed NeA.

Further, the charging efficiency CE may be calculated by preparing and calculating Equation 3 for calculating the amount of speed reduction Δω1 for each engine speed Ne, not being limited to use of the map. In this case, the charging efficiency CE is acquired by linear interpolation calculation, when the detected engine speed NeA is positioned between the engine speeds Nex and Ney in a calculus equation.

Referring again to FIG. 4, the proportional constant calculating section 17 calculates the proportional constant K from the amount of fuel injected GF, and the charging efficiency CE, and a stoichiometric detection signal ST, by using Equation 1. The stoichiometric detection signal ST is output from a stoichiometric detecting unit 18 when it is detected that the fuel injection control section 13 is performing stoichiometric control.

In the fuel injection control section 13 that performs theoretical air-fuel ratio control such as stoichiometric control by O2-feedback on the basis of the output of the oxygen concentration sensor 3, an instruction or control flag that shows the state of controlling the theoretical air-fuel ratio from managing calculation of the control in the stoichiometric control is acquired. Therefore, the air-fuel ratio when the control flag is detected is the theoretical air-fuel ratio. However, when the control is concentrated to the rich side in a high-load operation, such as starting or accelerating, the air-fuel ratio is for example 14.5, smaller than 14.7. In this state, when the stoichiometric detection signal ST is inputted, for example, the air-fuel ratio is specifically determined to 14.5 in accordance with the operation state, and the proportional constant K is acquired by substituting the air-fuel ratio of 14.5, the charging efficiency CE, and the amount of fuel injected Gf in Equation 1.

Figure 6:
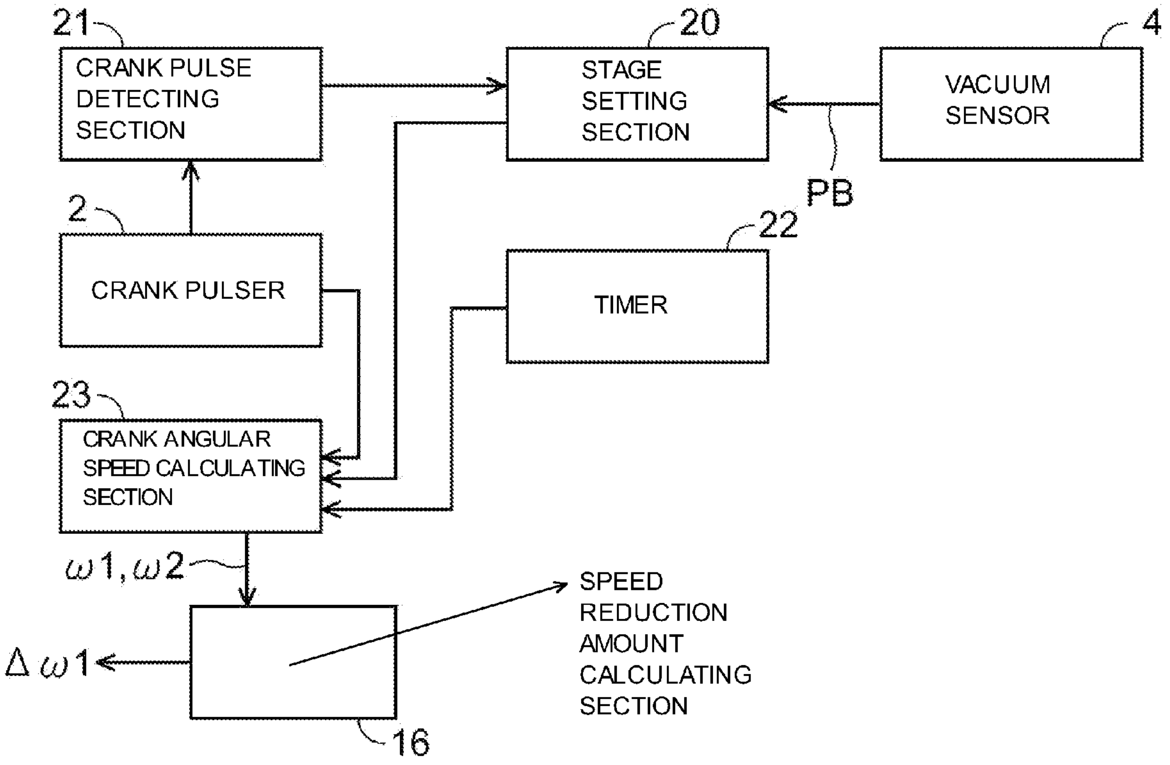
FIG. 6 is a block diagram showing a function of the ECU that calculates the amount of speed reduction $\Delta\omega$.

Next, a method of calculating the amount of speed reduction Δω1 of the crank angular speed will be described. FIG. 6 is a block diagram showing the function of the ECU 8 that calculates the amount of speed reduction Δω1. A stage setting section 20 detects a reference position of the crank pulser rotor 5 when the untoothed position H of the crank pulser 2 is detected by a crank pulse detecting section 21 and divides one rotation of the crankshaft 9 into the stages of total 11 of #0 to #10 first, on the basis of the arrangement of the reluctors 52.

Thereafter, a stage difference determination that determines and concludes the stroke on the basis of a fluctuation in intake pipe vacuum PB detected by the vacuum sensor 4 and further determines whether the crankshaft 9 made one rotation or two rotation in one cycle is performed, and one cycle (at a crank rotation angle of 720°) is divided into the states of total 22 of #0 to #21. The determination of the stroke based on a fluctuation in the intake pipe vacuum PB can be performed, for example, by checking a fluctuation pattern in detected vacuum with a fluctuation pattern acquired by an experiment relating to the stage. The determination of the stroke can be performed by employing a well-known stroke determination method.

A crank angular speed calculating section 23 calculates a crank angular speed ω1 on the basis of the interval τ1 (described below in connection with FIG. 8) of two continuous crank pulses which are generated at a position right before the compression top dead center or above the compression top dead center, in the stage set by a stage setting section 20. In the same way, the crank angular speed calculating section 23 calculates a crank angular speed ω2 on the basis of the interval τ2 (described below in connection with FIG. 8) of two crank pulses corresponding to an optional stage in the compression stroke. The speed reduction amount calculating unit 16 calculates the difference (ω2−ω1) between the crank angular speed ω2 in the compression stroke and the crank angular speed ω1 detected in a predetermined section overlapping the position of the top dead center of the engine, that is, the amount of speed reduction Δω1 in the compression stroke.

Figure 7:
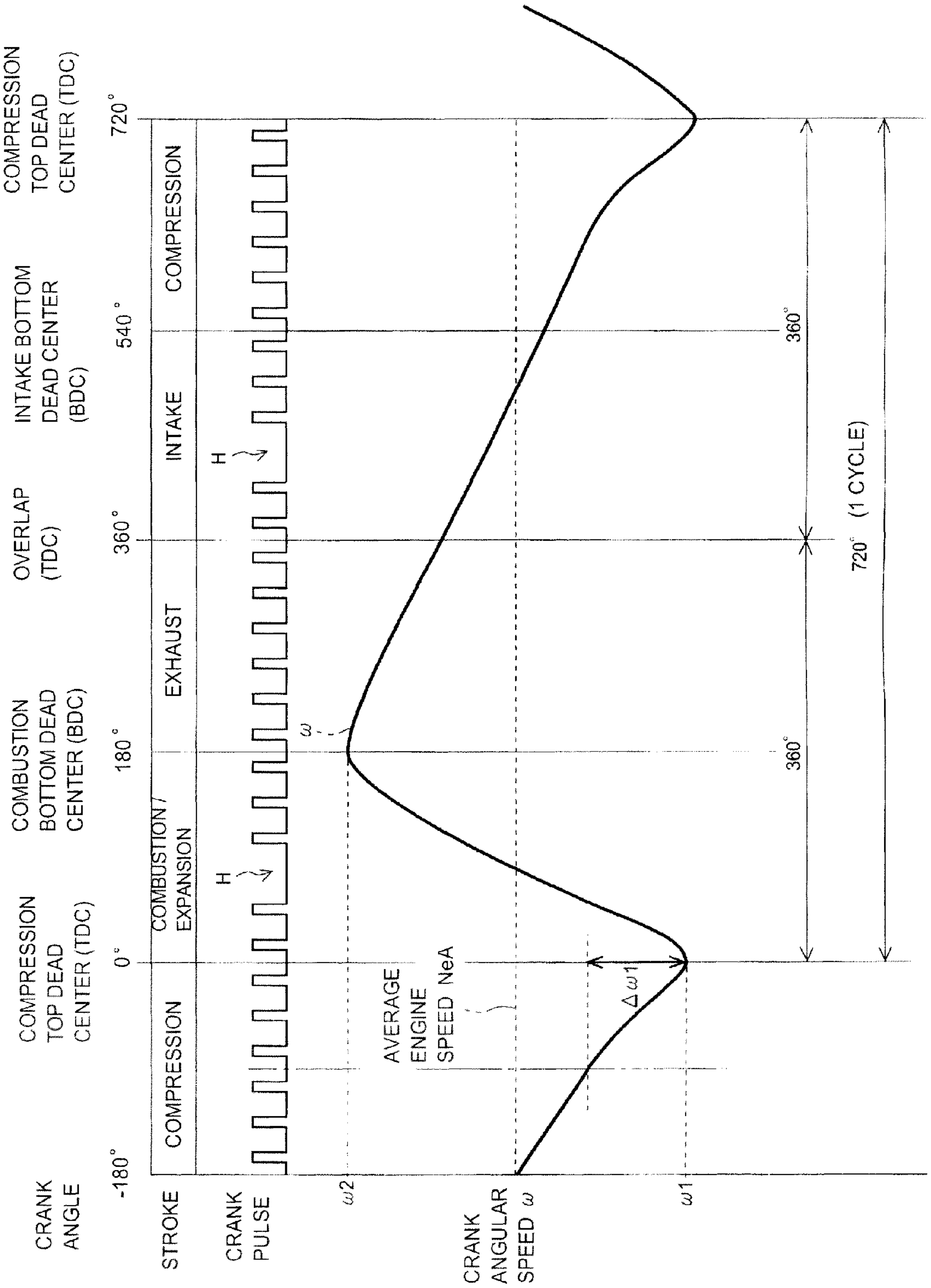
FIG. 7 is a time chart showing a relationship between a crank pulse and a crank angular speed $\omega$ in one cycle.
Figure 8:
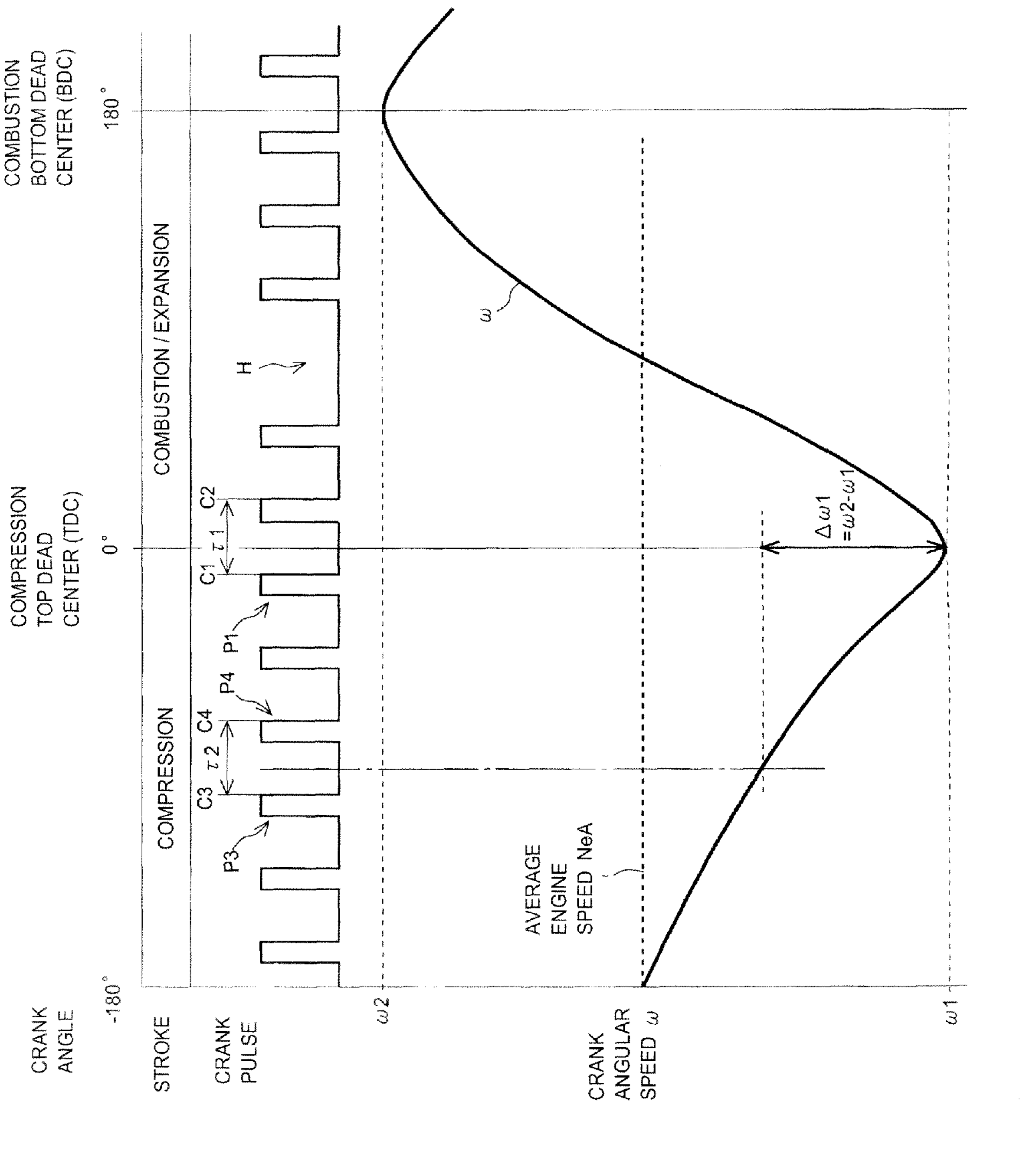
FIG. 8 is a partial enlarged view of FIG. 7.

FIG. 7 is a time chart showing the relationship between the crank pulse and the crank angular speed ω in one cycle and FIG. 8 is a partial enlarged view of FIG. 7. As can be seen from FIGS. 7 and 8, the crank angular speed ω is periodically fluctuated by the internal pressure of the cylinder in accordance with one cycle of the engine, that is, the four strokes of compression, combustion/expansion, exhaust, and intake strokes. In detail, in the late section of the compression stroke, the crank angular speed ω is decreased by compressive resistance due to an increase in the internal pressure of the cylinder. Further, in the combustion/expansion stroke, rotational energy of the crank is generated by the increase in the internal pressure of the cylinder due to combustion, such that the crank angular speed ω increases. In addition, the crank angular speed ω when the combustion/expansion stroke is finished meets the peak angular speed ω2 and is then decreased by a fluctuation in the internal pressure of the cylinder due to pump work, such as mechanical friction resistance in the engine, exhaust resistance of the exhaust stroke and burnt gas, and intake resistance in the intake stroke. According to the fluctuation in the crank angular speed ω, the crank angular speed ω1 is lower than the average revolution speed NeA.

Further, as the torque generated from the engine increases, the fluctuation peak of the crank angular speed ω increases and then the amount of decrease increases with the increase in the intake air volume. Therefore, the larger the generated torque and the intake air volume in the engine, the more the fluctuation in the crank angular speed ω increases. In addition, the fluctuation increases in a low rotation region with small inertial force of the crankshaft and, as in a single-cylinder engine, also increases in an engine in which the inertia moment of the crankshaft is relatively small.

Referring to FIG. 8, the crank angular speed ω1 is calculated by measuring the passing time τ1 of the 30-degree section from a point C1 positioned right before the compression top dead center where the crank pulse P1 decreases to a point C2 positioned right after the compression top dead center where the crank pulse P2 decreases, and by using the passing time τ1 and the arrangement angle interval of the reluctors 52. Further, the crank angular speed ω2 is calculated by measuring the passing time τ2 of the 30-degree section from a point C3 where two crank pulses P3 decrease and a point C4 where the crank pulse P4 decreases in an optional stage in the compression stroke, and by using the passing time τ2 and the arrangement angle interval of the reluctors 52.

Further, the crank pulses P1 and P2 are not limited to the two crank pulses above the compression top dead center and may be two continuous crank pulses right before the compression top dead center, for example. That is, it is preferable to calculate the crank angular speed ω1 on the basis of the generation interval τ1 of two continuous crank pulses around the compression top dead center or above the compression top dead center.

Figure 9:
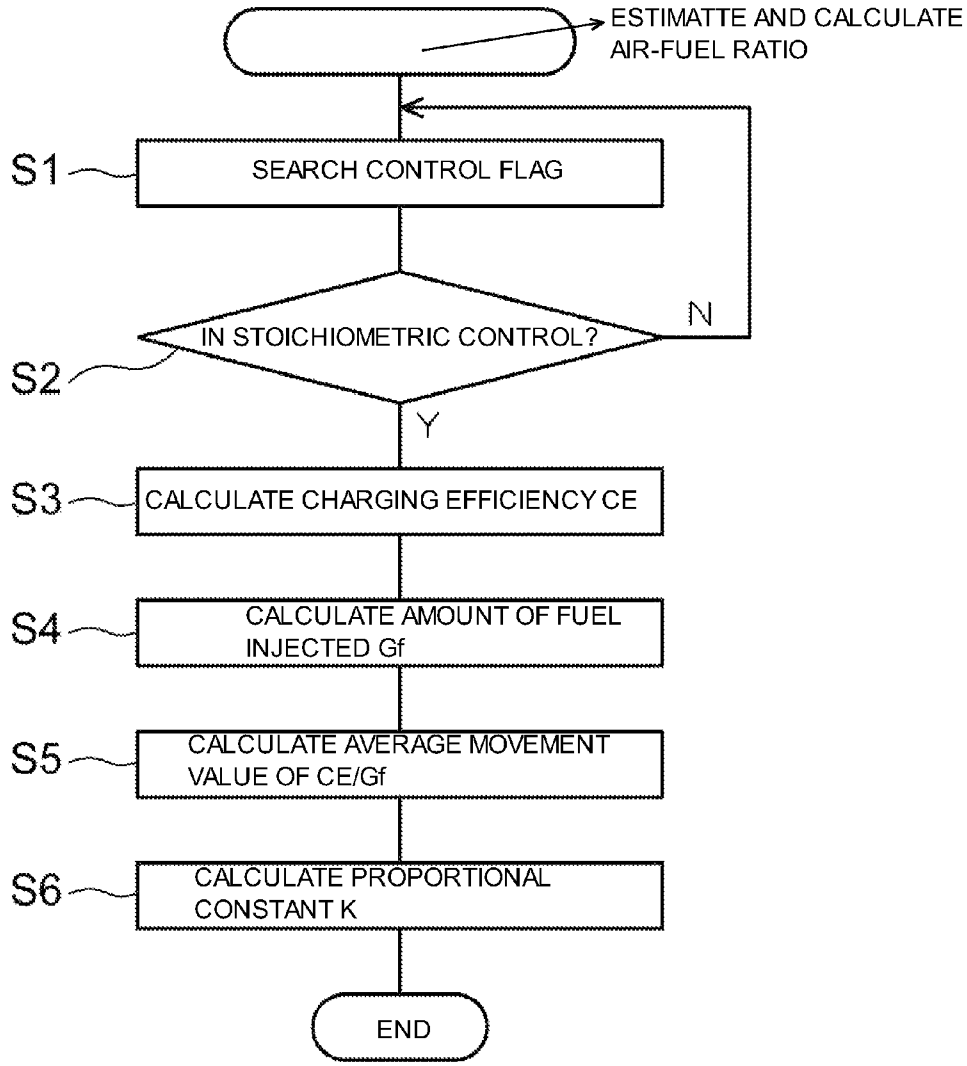
FIG. 9 is a main flowchart of air-fuel ratio estimation calculation.

Next, the operation of calculating an air-fuel ratio will be described with reference to the flowchart of FIG. 9. FIG. 9 is a main flowchart illustrating estimation calculation of an air-fuel ratio. In step S1, a control flag showing stoichiometric control is searched. In step S2, it is determined whether the control flag showing stoichiometric control was searched. When the determination is positive, the process proceeds to step S3 and calculates the charging efficiency CE. In step S4, the amount of fuel injected Gf is calculated. In step S5, a movement average value of the value CE/Gf, dividing the charging efficiency CE by the amount of fuel injected Gf, is calculated. In step S6, the proportional constant K in Equation 1 is calculated. That is, the proportional constant K is calculated by substituting the value CE/Gf calculated in step S5 and the air-fuel ratio of 14.5 in the stoichiometric control in Equation 1.

The proportional constant K calculated in this way can be used with Equation 1 in order to estimate the air-fuel ratio in the regions other than the transition region R of the output of the oxygen concentration sensor 3.

Figure 10:
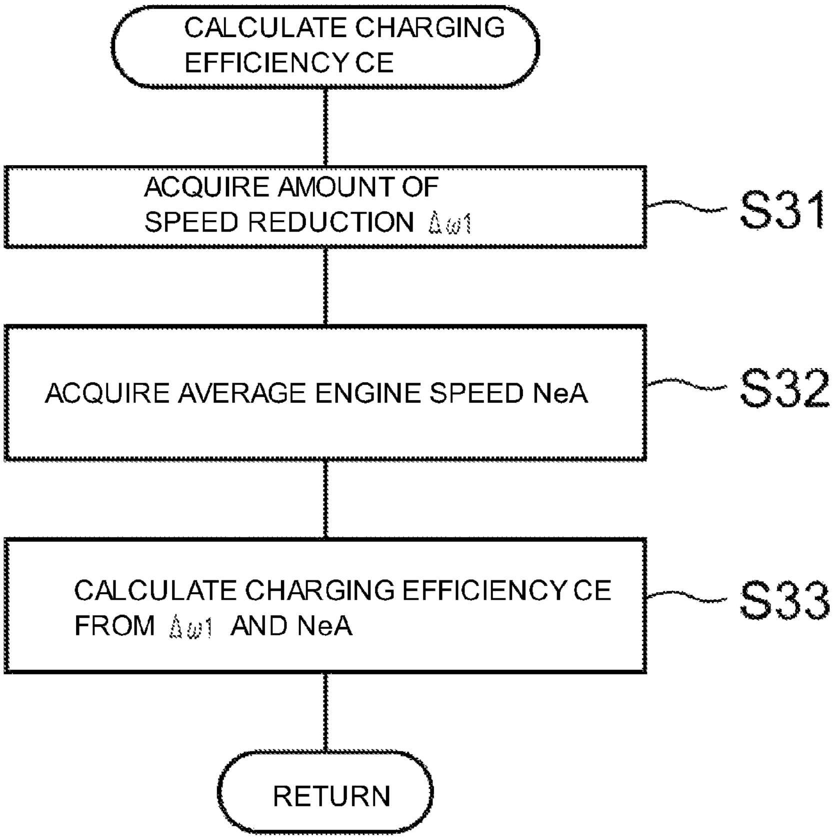
FIG. 10 is a flowchart of calculating the charging efficiency CE.

FIG. 10 is a flowchart illustrating calculation of the charging efficiency CE. In FIG. 10, in step S31, the amount of speed reduction Δω1 is acquired. The amount of speed reduction Δω1 is calculated by the speed reduction calculating section 16. In step S32, the average engine speed NeA is acquired. The engine speed NeA is calculated by the engine speed calculating section 15. In step S33, the charging efficiency CE that is a function of the amount of speed reduction Δω1 and the average engine speed NeA is calculated, for example, by using the map of FIG. 5.

Figure 11:
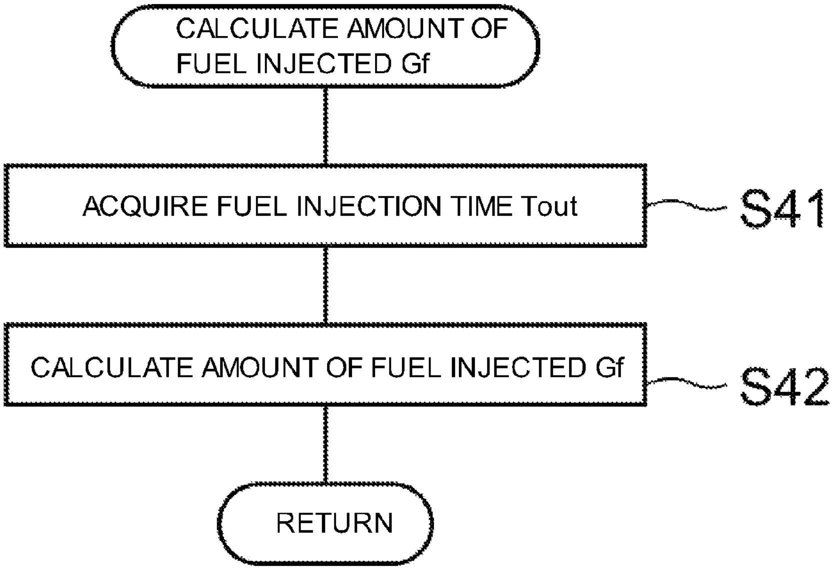
FIG. 11 is a flowchart of calculating the amount of fuel injected Gf.

FIG. 11 is a flowchart illustrating calculation of the amount of fuel injected Gf. In FIG. 11, in step S41, the fuel injection time Tout is acquired. In step S42, the amount of fuel injected Gf is calculated using Equation 2.

As described above, in the embodiment, when the air-fuel ratio is acquired by using the charging efficiency CE, the amount of fuel injected Gf, and the proportional constant K, the proportional constant K is determined by using the air-fuel ratio (theoretical air-fuel ratio) in the stoichiometric control by O2-feedback and the air-fuel ratio can be estimated by using the proportional constant K in the regions other than the output transition region R of the oxygen concentration sensor 3.

Further, in the embodiment, although the charging efficiency CE is calculated from the proportional relationship between the intake air volume and the charging efficiency CE and the proportional constant K of Equation 1 is acquired from the calculation result, the present invention is not limited thereto and it may be possible to detect the intake air volume with an airflow sensor and acquire the proportional constant K from Equation 1.

That is, it may be possible to acquire the proportional constant K that is proportionate to the theoretical air-fuel ratio by using that air-fuel ratio, that is, the theoretical air-fuel ratio when the output of the oxygen concentration sensor 3 having the output feature changing in a stepwise fashion is at the transition region R, the parameter about the intake air volume, and the amount of fuel injected, and it may be possible to estimate the air-fuel ratio even in the regions other than the transition region R, using the proportional constant K.

Although the present invention has been described in various embodiments, numerous modifications can be made to the disclosed embodiments and still remain within the spirit and scope of the invention. The scope of the invention, therefore, is limited only by a proper construction of the appended claims.

DESCRIPTION OF REFERENCE NUMBERS

1 . . . Engine control device
2 . . . Crank pulser
3 . . . Oxygen concentration sensor
5 . . . Crank pulser rotor
6 . . . Ignition device
8 . . . ECU
9 . . . Crankshaft
11 . . . Air-fuel ratio calculating section
12 . . . Fuel injection amount calculating section
13 . . . Fuel injection control section
14 . . . Charging efficiency calculating section
16 . . . Speed reduction amount calculating section
17 . . . Proportional constant calculating section
18 . . . Stoichiometric detecting section

The invention claimed is:

1. An air-fuel ratio estimating/detecting device, comprising:

an intake air volume estimating unit configured to estimate intake air volume introduced into a cylinder of an engine;

a fuel injection amount estimating unit configured to estimate an amount of fuel injected for each cycle based upon a driving time of a fuel injection valve;

an oxygen concentration detecting element having an output transition region where detection output according to concentration of oxygen remaining in a combustion gas is generated and the detection output changes in a stepwise fashion in accordance with the concentration of the remaining oxygen corresponding to a theoretical air-fuel ratio; and a proportional constant determining unit configured to determine a proportional constant of an air-fuel ratio and the theoretical air-fuel ratio by using the intake air volume estimated by the intake air volume estimating unit when an output value of the oxygen concentration detecting element is in the output transition region and the amount of fuel injected estimated by the amount of fuel injected estimating unit, wherein when the output value of the oxygen concentration detecting element is not in the output transition region, the air-fuel ratio is estimated from the proportional constant determined by the proportional constant determining unit, the intake air volume, and the amount of fuel injected.

2. The air-fuel ratio estimating/detecting device according to claim 1, further comprising an airflow sensor configured to sense the intake air volume in the engine, wherein the intake air volume sensed by the airflow sensor is used for the calculation in the proportional constant determining unit, instead of the intake air volume estimated by the estimation intake air volume estimating unit.

3. An air-fuel ratio estimating/detecting device, comprising:

a pulse generating unit configured to generate a crank pulse for each predetermined rotation angle of a crankshaft of an engine;

a crank angular speed calculating unit configured to calculate a first crank angular speed based upon an interval of two continuous crank pulses at a compression top dead center or above the compression top dead center of the engine, and to calculate a second crank angular speed based upon an interval of two continuous optional crank pulses in a compression stroke;

an intake air volume estimating unit configured to calculate charging efficiency that is a function of an intake air volume from a difference between the first crank angular speed and the second crank angular speed, which are calculated by the crank angular speed calculating unit;

a fuel injection amount estimating unit configured to estimate an amount of fuel injected for each cycle based upon driving time of a fuel injection valve;

an oxygen concentration detecting element that has an output transition region where detection output according to a concentration of oxygen remaining in a combustion gas is generated and the detection output changes in a stepwise fashion in accordance with the concentration of the remaining oxygen corresponding to a theoretical air-fuel ratio; and a proportional constant determining unit configured to determine a proportional constant of an air-fuel ratio and the theoretical air-fuel ratio by using the intake air volume estimated by the intake air volume estimating unit when an output value of the oxygen concentration detecting element is in the output transition region and the amount of fuel injected estimated by the fuel injection amount estimating unit, wherein when the output value of the oxygen concentration detecting element is not in the output transition region, the air-fuel ratio is estimated from the proportional constant determined by the proportional constant determining unit, the charging efficiency, and the amount of fuel injected.

4. The air-fuel ratio estimating/detecting device according to claim 2, further comprising an airflow sensor configured to sense the intake air volume in the engine, wherein the intake air volume sensed by the airflow sensor is used for the calculation in the proportional constant determining unit, instead of the intake air volume estimated by the estimation intake air volume estimating unit.

5. An air-fuel ratio estimating/detecting device comprising:

intake air volume estimating means for estimating intake air volume introduced into a cylinder of an engine;

fuel injection amount estimating means for estimating the amount of fuel injected for each cycle on the basis of driving time of a fuel injection valve;

an oxygen concentration detecting means for detecting oxygen concentration, said oxygen concentration element having an output transition region where detection output according to concentration of oxygen remaining in a combustion gas is generated and the detection output changes in a stepwise fashion in accordance with the concentration of the remaining oxygen corresponding to a theoretical air-fuel ratio; and proportional constant determining means for determining a proportional constant of an air-fuel ratio and the theoretical air-fuel ratio by using the intake air volume estimated by the intake air volume estimating means when an output value of the oxygen concentration detecting means is in the output transition region and the amount of fuel injected estimated by the amount of fuel injected estimating means, wherein when the output value of the oxygen concentration detecting means is not in the output transition region, the air-fuel ratio is estimated from the proportional constant determined by the proportional constant determining means, the intake air volume, and the amount of fuel injected.

6. The air-fuel ratio estimating/detecting device according to claim 5, further comprising airflow sensor means for sensing the intake air volume in the engine, wherein the intake air volume sensed by the airflow sensor means is used for the calculation in the proportional constant determining means, instead of the intake air volume estimated by the estimation intake air volume estimating means.

7. An air-fuel ratio estimating/detecting device, comprising:

pulse generating means for generating a crank pulse for each predetermined rotation angle of a crank shaft of an engine;

crank angular speed calculating means for calculating a first crank angular speed based upon an interval of two continuous crank pulses at a compression top dead center or above the compression top dead center of the engine, and for calculating a second crank angular speed based upon an interval of two continuous optional crank pulses in a compression stroke;

intake air volume estimating means for calculating charging efficiency that is a function of an intake air volume from a difference between the first crank angular speed and the second crank angular speed, which are calculated by the crank angular speed calculating means;

fuel injection amount estimating means for estimating an amount of fuel injected for each cycle based upon driving time of a fuel injection valve;

oxygen concentration detecting means for detecting oxygen concentration, said oxygen concentration detecting means having an output transition region where detection output according to a concentration of oxygen remaining in a combustion gas is generated, and the detection output changes in a stepwise fashion in accordance with the concentration of the remaining oxygen corresponding to a theoretical air-fuel ratio; and proportional constant determining means for determining a proportional constant of an air-fuel ratio and the theoretical air-fuel ratio by using the intake air volume estimated by the intake air volume estimating means when an output value of the oxygen concentration detecting means is in the output transition region and the amount of fuel injected estimated by the fuel injection amount estimating means, wherein the output value of the oxygen concentration detecting means is not in the output transition region, the air-fuel ratio is estimated from the proportional constant determined by the proportional constant determining means, the charging efficiency, and the amount of fuel injected.

8. The air-fuel ratio estimating/detecting device according to claim 7, further comprising airflow sensor means for sensing the intake air volume in the engine, wherein the intake air volume sensed by the airflow sensor means is used for the calculation in the proportional constant determining means, instead of the intake air volume estimated by the estimation intake air volume estimating means.

9. A method for detecting an air-fuel ratio, said method comprising:

estimating intake air volume introduced into a cylinder of an engine;

estimating an amount of fuel injected for each cycle based upon a driving time of a fuel injection valve;

generating a detection output according to concentration of oxygen remaining in a combustion gas, wherein the detection output changes in a stepwise fashion in accordance with a concentration of the remaining oxygen corresponding to a theoretical air-fuel ratio; and determining a proportional constant of an air-fuel ratio and the theoretical air-fuel ratio by using the estimated intake air volume when an output value of the detection output is in the output transition region, and the estimated amount of fuel injected, wherein when the detection output is not in the output transition region, the air-fuel ratio is estimated from the proportional constant, the intake air volume, and the amount of fuel injected.

10. The method according to claim 9, further comprising:

sensing the intake air volume of the engine using a sensor, wherein the sensed intake air volume is used for the determination of the proportional constant, instead of the estimated intake air volume.

* * * * *